Jan. 18, 1955
H. F. FLOWERS
2,699,733
BODY SUPPORT FOR INDEPENDENT TRUCK MINE CARS
Filed Aug. 7, 1950
5 Sheets-Sheet 1
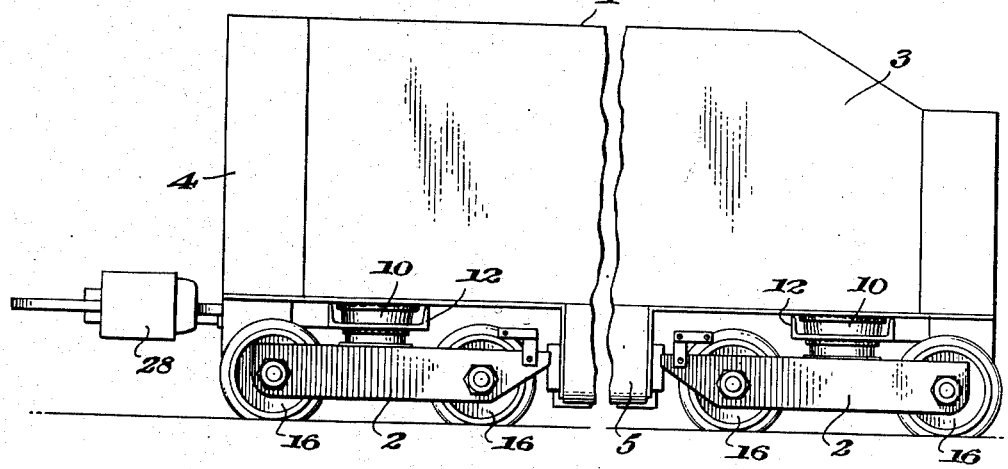
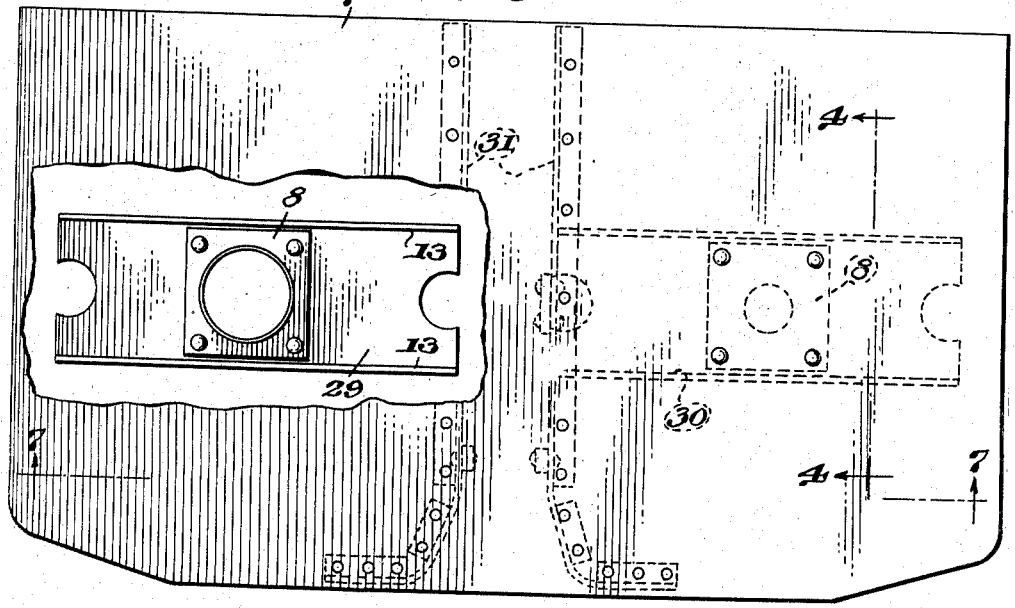
INVENTOR
Henry Fort Flowers
BY Mason, Porter, Diller & Stewart
ATTORNEYS Jan. 18, 1955  H. F. FLOWERS  2,699,733
BODY SUPPORT FOR INDEPENDENT TRUCK MINE CARS
Filed Aug. 7, 1950  5 Sheets-Sheet 2
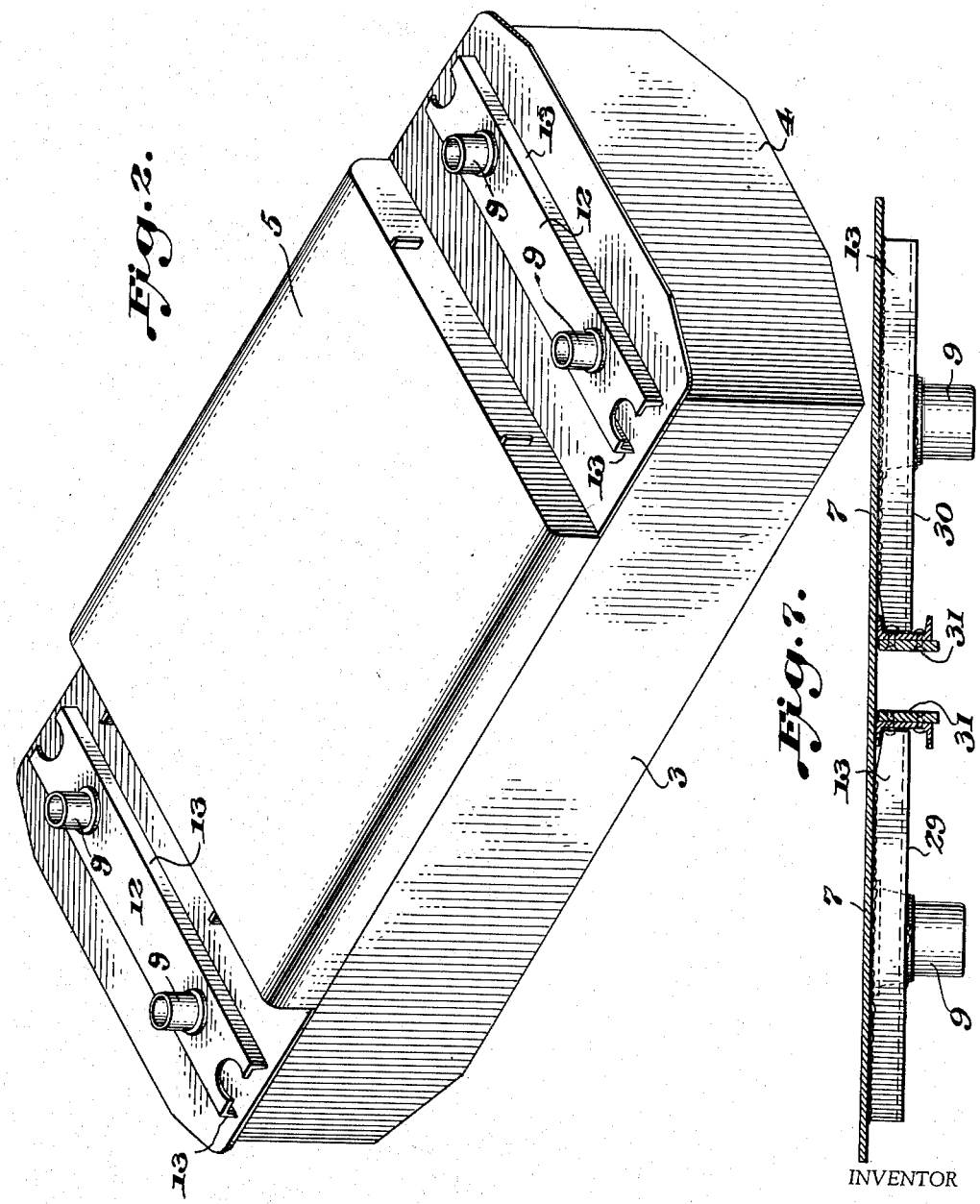
INVENTOR
Henry Foot Flowers
BY Mason, Porter, Diller & Stewart
ATTORNEYS

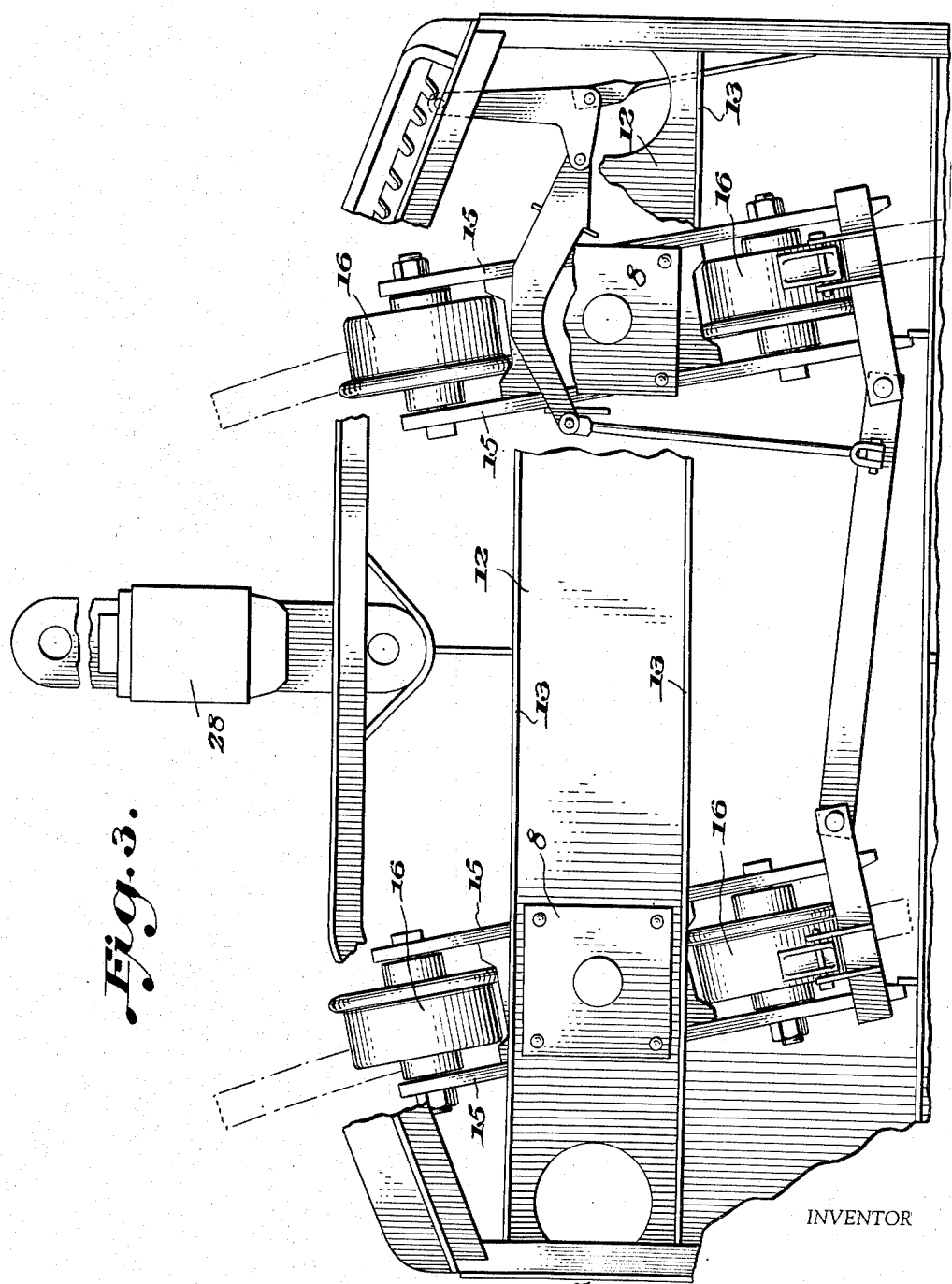

Jan. 18, 1955     H. F. FLOWERS     2,699,733
BODY SUPPORT FOR INDEPENDENT TRUCK MINE CARS
Filed Aug. 7, 1950     5 Sheets-Sheet 4
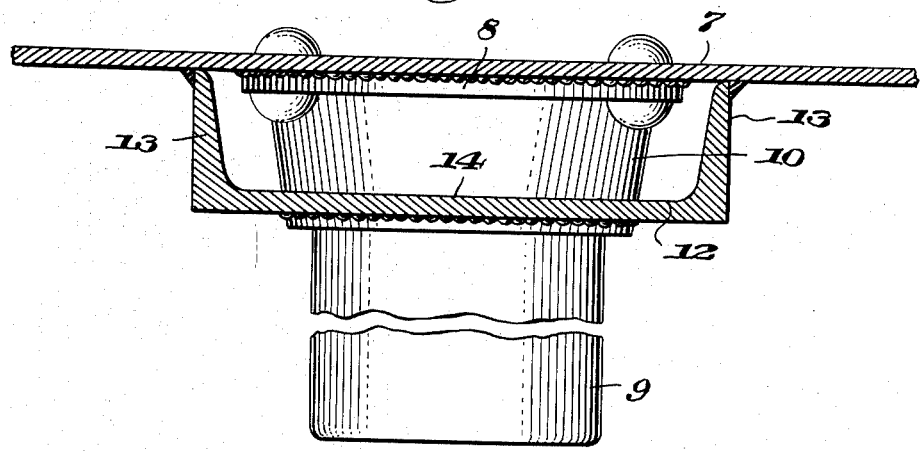
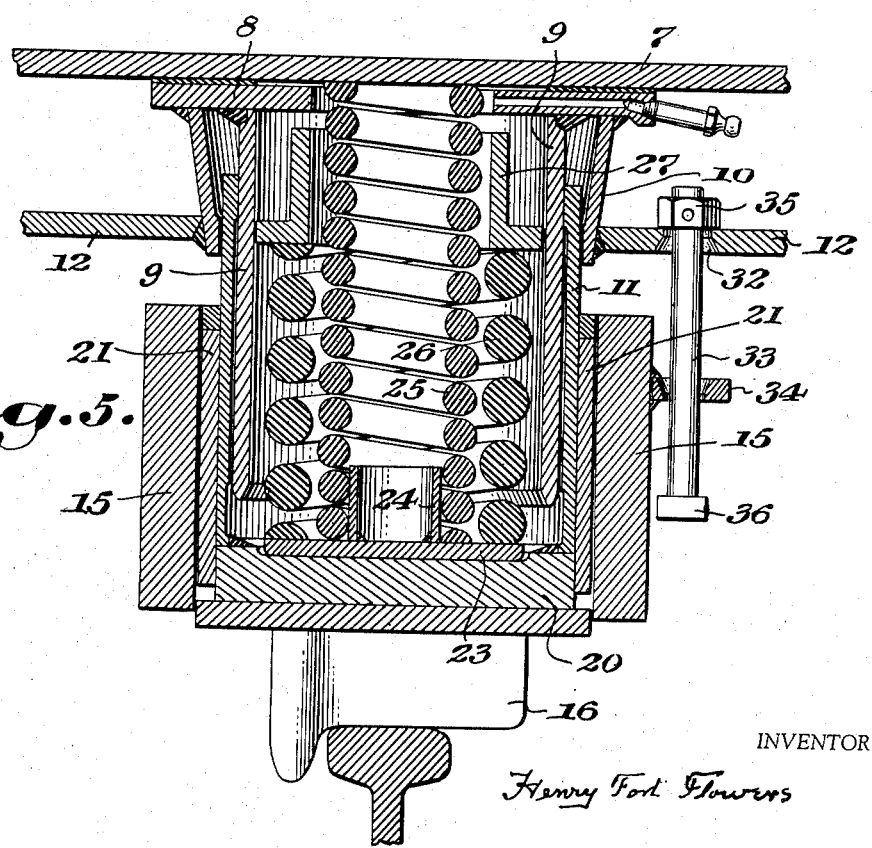
INVENTOR
Henry Ford Flowers
BY Mason, Porter, Diller & Stewart
ATTORNEYS Jan. 18, 1955   H. F. FLOWERS   2,699,733
BODY SUPPORT FOR INDEPENDENT TRUCK MINE CARS
Filed Aug. 7, 1950   5 Sheets-Sheet 5
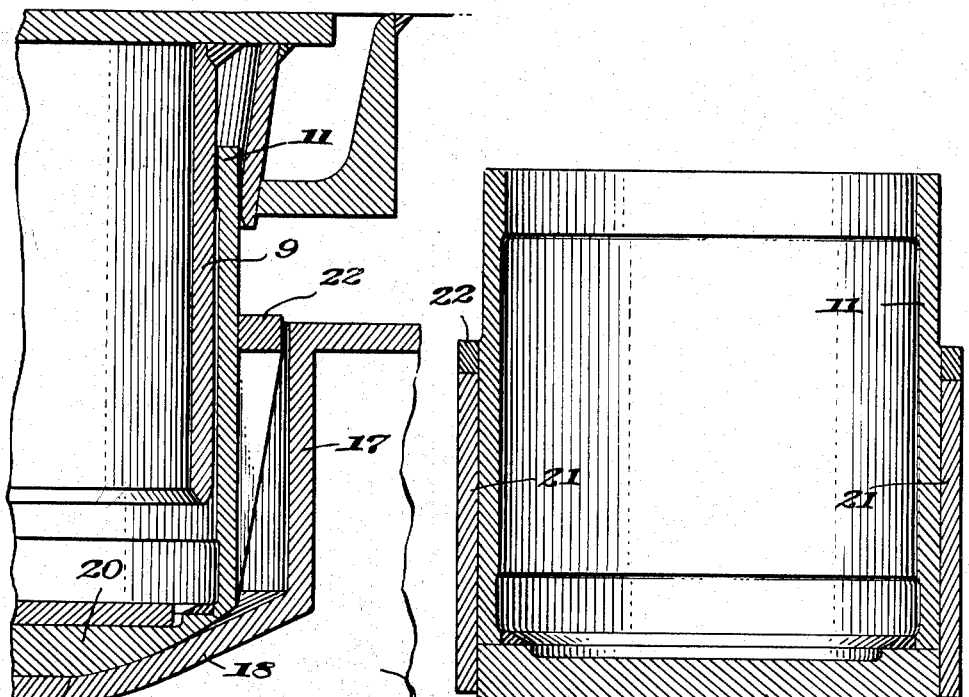
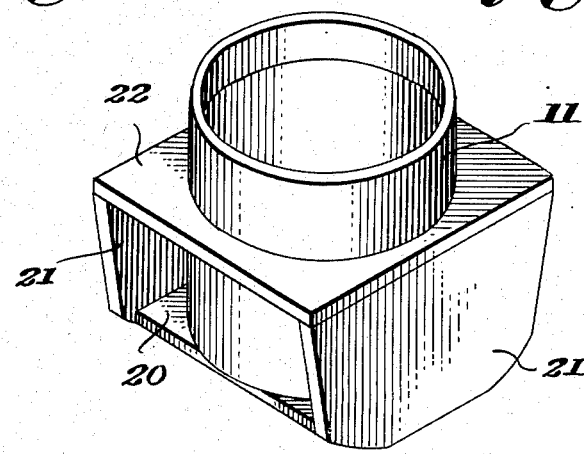
INVENTOR
Henry Fort Flowers
BY Mason, Porter, Diller & Stewart
ATTORNEYS

United States Patent Office 2,699,733
Patented Jan. 18, 1955

2,699,733

BODY SUPPORT FOR INDEPENDENT TRUCK MINE CARS

Henry Ford Flowers, Findlay, Ohio

Application August 7, 1950, Serial No. 178,082

6 Claims. (Cl. 105—199)

In my prior application, Serial Number 700,316, filed September 30, 1946, now Patent 2,633,089, there is shown and described a tandem wheel truck wherein a king post rigidly mounted on the bottom plate of the vehicle body fits within a body supporting member carried by the wheel truck and wherein the king post moves vertically in the body supporting member while the body supporting member can turn about the center of the king post as an axis. This body supporting member or gimbal is in turn mounted on the truck frame so that it may shift relative thereto to permit the truck frame to oscillate in the vertical plane of the wheels. Disposed between the king posts and the body supporting member is a heavy and a light spring.

The present invention has to do with improvements in a manner of supporting the king posts against lateral thrusts thereon and also in the body supporting member or gimbal carried by the truck frame and receiving the king posts.

An object of the invention is to provide the body portion of the car carrying the king posts with means for supporting the king posts against excessive lateral bending strain.

A further object of the invention is to provide a supporting means of the above type which is in the form of an inverted channel beam extending transversely of the body with the flanges of the channel beam welded to the underface of the body member and wherein the web of said channel beam has an opening through which the king post and dust guard associated therewith extend with the dust guard contacting and welded to the channel beam.

A further object is to provide a gimbal support for the kingposts which includes side members adapted to make movable contact with the side members of the truck frame, a bottom plate and a top plate connecting said side members of the gimbal and a sleeve passing through the top plate and resting on the bottom plate to which said sleeve is welded.

These and other objects will in part be obvious and will in part be hereinafter more fully disclosed.

In the drawings:

Figure 1 is a side view of a mine car to which the improvements have been applied;

Figure 2 is a perspective view of the body of the car turned upside down;

Figure 3 is a plan view of a portion of the channel beam and its relation to the trucks and a cushion coupler;

Figure 4 is a sectional view through the floor plate and channel beam showing the king post, the plate supporting the same and the dust guard associated therewith in side elevation, the section being taken on the line 4—4 of Figure 6;

Figure 5 is a transverse sectional view through the floor plate, channel beam, kingpost, gimbal, and truck frame with the parts positioned under light load;

Figure 6 is a plan view of the floor plate of a mine car with parts broken away to show the channel beam made in sections with a space between the inner ends thereof for the spring draft gear;

Figure 7 is a sectional view on the line 7—7 of Figure 6;

Figure 8 is a longitudinal sectional view through the floor plate, king post, dust guard, channel beam, the gimbal or body support and the truck frame support for the gimbal;

Figure 9 is a perspective view of the gimbal; and

Figure 10 is a transverse sectional view through the gimbal.

While the improvements which will be hereinafter described in detail are capable of general use in connection with tandem trucks or vehicles, they are particularly useful in connection with a mine car such as shown and described in my copending application, Ser. No. 700,316, supra.

The mine car includes a body 1, mounted on tandem trucks 2, 2. The body as shown in Figure 2 includes side members 3, 3 and end members 4, 4 and bottom plates which are welded together to form a unitary structure. The body also has a central well indicated at 5. There are two tandem trucks at each end of the car on which the car body is mounted. There is a king post 9 for each truck. These trucks and king posts associated therewith for supporting the body are all of similar construction and the description of the improvements in connection with one truck will answer for the others.

Referring to Figures 4, 5 and 8, the floor plate is indicated at 7 and has attached to its underface a king post supporting plate 8 which may be riveted or welded to the underface of the floor plate 7. The king post 9 is hollow and cylindrical in shape. This king post is welded to the underface of the supporting plate 8.

There is a dust guard 10 welded to the underface of this supporting plate 8 and this dust guard is spaced away from the king post to receive the sleeve 11 of the gimbal. This sleeve makes contact with the king post but the king post is free to turn in the sleeve and move up and down therein. The sleeve is very close to the dust guard with only a slight clearance therebetween.

Disposed below the floor plate 7 is a channel beam 12 which extends transversely of the car body as shown in Figures 2 and 3. The channel beam 12 may be said to be inverted and its flanges 13, 13 extend upwardly and are welded to the underface of the floor plate 7. The web 14 of this channel beam has an opening therethrough which is dimensioned so as to receive the lower end of the dust guard 10. The king post 9 extends down through the opening and the sleeve 11 of the gimbal extends up through the opening. This channel beam supports the kingpost against lateral bending strain thereon. Any bending strain on the king post will force the sleeve 11 into contact with the dust guard and the dust guard will be held from yielding by this channel beam.

The truck frame includes spaced side members 15, 15. There is a wheel 16 at each end of the truck frame mounted upon a suitable bearing spindle. Extending from one side member to the other are vertically arranged plates 17, 17 and a bottom plate 18. These plates are welded together as a unit and are also welded to the side members of the truck frame. This provides a support for the gimbal. The inner face 19 of the bottom member is curved and the bottom plate 20 is also curved and rests on this curved face 19 of the gimbal supporting member so that the gimbal can shift to permit the truck to swing in a vertical plane extending longitudinally of the truck. This gimbal supporting member on the truck frame is shown and described more in detail in my application, Ser. No. 700,316 supra. The gimbal is shown in detail in Figs. 9 and 10 of the drawings. It includes side members 21, 21 which are connected by the bottom plate 20 and a top plate 22. These plates are welded together into a solid unitary structure. Extending through an opening in the plate 22 and snugly fitting the walls of the opening is a sleeve 11. This sleeve rests on the bottom plate 20 and is welded thereto. The sleeve 11 also contacts the side members 21, 21. This makes up a very strong unitary gimbal. The side members 21, 21 have movable contacts with the side members 15, 15 of the truck frame. As noted above, the bottom plate 18 of the body support may shift relative to the bottom plate 20 of the gimbal and thus permit the truck to spring in a vertical plane when passing uneven places in the track.

Mounted on the inner face of the bottom member 20 of the gimbal is an abutment plate 23 having a rigid sleeve 24 disposed centrally thereof. A light spring 25 encircles this central sleeve and bears against the abutment plate 23. This spring at its upper end extends through an opening in the plate 8 and bears against the floor plate 7. Also mounted on the abutment plate 23 is a heavy spring 26. This heavy spring is much shorter than the light spring and a flanged abutment sleeve 27 rests on the upper end of the heavy spring. This flanged abutment 27 under light loads is spaced away from the plate 8, but under heavy loads the flanged abutment will contact the plate 8. This particular arrangement of the springs and the abutment plate are described and claimed in my copending application Ser. No. 660,990, filed April 10, 1946, now Patent 2,602,401.

The king post 9 and dust guard 10 are both welded to the same base plate 8 and the dust guard is welded to the web of the channel beam 12. The sleeve 11 of the gimbal extends upwardly along the king posts, making contact therewith. There is a clearance between this sleeve 11 and the dust guard, but this clearance is close enough so that any horizontal blow on the truck will deflect the king post sufficiently to transmit the shock through the upper portion of the gimbal sleeve to the dust guard and channel beam without permanently bending the king post. This structure is particularly advantageous in coal mining where the cars are often pushed off the end of the track while being loaded. These shocks of derailing and rerailing are quite severe, but can be readily restrained against permanently bending the king posts and damaging the floor plate by this channel beam. The gimbal side members 21, 21 contact with the side members of the wheel frame and while the truck may swing in a vertical plane parallel with the side members the gimbal is supported against lateral movement relative to the truck frame. The top plate connecting the side members of the gimbal provides a very rigid support for the sleeve of the gimbal.

In Figures 2 and 3 of the drawings, the channel beam 12 is shown as extending all the way across the bottom plate of the car and the wheel trucks are mounted very close to the front end of the car body giving greater capacity for the load carrying well between the front and rear trucks.

As shown in Figures 1 and 3 a cushion coupler 28 is employed for connecting the cars. This cushion coupler is shown in detail in my copending application Ser. No. 27,671, filed May 18, 1948, now Patent 2,602,553. The cushion coupler takes the place of the spring draft gear and therefore the channel beam can extend all the way across the car.

In Figures 6 and 7 the channel beam is shown as made in two sections 29 and 30 and between the ends of these sections are longitudinal channel beams 31, 31 which are placed so as to provide a space for a spring draft gear. These sectional channel beams still provide a strong support for the king posts 9, preventing the permanent bending thereof and the damage of the floor plates 7 of the car.

As shown in Figure 5, the channel beam has an opening 32 disposed at one side of the dust guard 10. Extending down through this opening is a rod 33. The side frame 15 of the truck has a plate 34 welded thereto and this plate is provided with an opening through which the rod extends. There is a nut 35 permanently secured to the upper end of the rod and a head 36 permanently secured to the lower end of the rod. This rod does not in any way interfere with the up and down movements of the king posts relative to the gimbal, but in case of derailment these rods associated with each truck will prevent the disengagement of the gimbal from the king posts.

It is obvious that changes in the details of construction may be made without departing from the spirit of the invention set forth in the appended claims.

I claim:

1. The combination of a vehicle body member, a supporting plate attached to the underside of said body member, a cylindrical king post rigidly connected to said supporting plate, a channel beam disposed beneath said body member and extending transversely thereof, the web of said channel beam being disposed beneath the supporting plate and spaced therefrom with the flanges thereof extending upwardly and rigidly secured to said body member, said web having an opening through which the king post depends, a tandem wheel truck having a gimbal on which said king post is mounted, said gimbal including a sleeve fitting the king post and extending upwardly along said post through the opening in said web, and means whereby said web operating through said sleeve relieves the king post from excessive side thrusts.

2. The combination of a vehicle body member, a supporting plate attached to the underside of said body member, a cylindrical king post rigidly connected to said supporting plate, a dust guard rigidly connected to said supporting plate and spaced from said king post, a channel beam disposed beneath said body member and extending transversely thereof, the web of said channel beam being disposed beneath the supporting plate and spaced therefrom with the flanges thereof extending upwardly and rigidly secured to said body member, said web having an opening through which the king post and dust guard depend, said dust guard contacting said web at the opening, a tandem wheel truck on which said king post is mounted, said wheel truck including side frames, a gimbal support connected to said side frames, a gimbal mounted on said gimbal support and including side members disposed adjacent the side frames of the truck, a top plate and a bottom plate rigidly connecting said side members and a sleeve fitting an opening in said top plate and rigidly secured to said bottom plate, said sleeve extending upwardly between the king post and the dust guard and dimensioned so that lateral thrusts imposed upon the king post and gimbal sleeve will be restrained by the dust guard and web of the channel beam, a yielding means disposed between the gimbal and the body member for supporting the body.

3. The combination of a vehicle body member, a supporting plate attached to the underside of said body member, a cylindrical king post rigidly connected to said supporting plate and a tandem wheel truck on which the king post is mounted, said wheel truck including side frames, a gimbal support connected to said side frames, a gimbal mounted on said gimbal support and including side members movably contacting said side frames of the truck, a top plate and a bottom plate rigidly connected to said side members, a sleeve fitting an opening in said top plate and rigidly secured to said bottom plate and extending upwardly from said gimbal and adapted to receive the king post, and yielding means disposed between the gimbal and the body member for supporting said body member.

4. The combination of a vehicle body member, a supporting plate attached to the underside of said body member adjacent each side thereof and in a line transversely of the body member, a cylindrical king post rigidly connected to each supporting plate, a dust guard rigidly connected to said supporting plate and positioned about and spaced from said king post, a channel beam disposed beneath said body member and extending transversely thereof from one side of the vehicle body to the other, the web of said channel beam being disposed beneath the supporting plates and spaced therefrom with the flanges thereof extending upwardly and rigidly secured to said body member, said web having openings through which the respective king posts depend, a tandem wheel truck having a gimbal on which said king post is mounted, said gimbal including a sleeve fitting the king post and extending upwardly along said post between the dust guard and the king post, and contacting said dust guard and king post, said web operating through said dust guard and sleeve for relieving the king post from excessive side thrusts.

5. The combination of a vehicle body member, a supporting plate attached to the underside of said body member, a cylindrical king post rigidly connected to said supporting plate, a dust guard connected to said plate and positioned about and spaced from said king post, a channel beam disposed beneath said body member and extending transversely thereof, the web of said channel beam being disposed beneath the supporting plate and spaced therefrom with the flanges thereof extending upwardly and rigidly secured to said body member, said web having an opening through which the king post and said dust guard depend, a tandem wheel truck having a gimbal on which said king post is mounted, said gimbal including a sleeve fitting said king post and extending upwardly along the same through the opening between the dust guard and the king post, said dust guard and sleeve being dimensioned so that the web, dust guard, sleeve and king post engage each other and relieve the king post from excessive side thrusts.

6. The combination of a vehicle body member, a supporting plate attached to the underside of said body member, a cylindrical king post rigidly connected to said supporting plate, a dust guard rigidly connected to said supporting plate and positioned about and spaced from said king post, a channel beam disposed beneath said body member and extending transversely thereof, the web of said channel beam being disposed beneath the supporting plate and spaced therefrom with the flanges thereof extending upwardly and rigidly secured to said body member, said web having an opening through which the king post and dust guard depend, said dust guard contacting said web at the opening and secured thereto, a tandem wheel truck on which said king post is mounted, said wheel truck including side frames, a gimbal support connected to said side frames, a gimbal mounted on said support and having a sleeve rigidly carried thereby and adapted to receive said king post, said sleeve extending upwardly between the king post and the dust guard and dimensioned to make contact with the dust guard and king post so that lateral thrusts imposed upon the gimbal and gimbal sleeve will be restrained by the dust guard and web of the channel beam, and yielding means disposed between the gimbal and the body member for supporting the body.

References Cited in the file of this patent

UNITED STATES PATENTS

| | | |
|---|---|---|
| 1,279,425 | Pflager | Sept. 17, 1918 |
| 2,034,504 | Bugatti | Mar. 17, 1936 |
| 2,078,915 | Flowers | Apr. 27, 1937 |
| 2,096,005 | Piron | Oct. 19, 1937 |
| 2,461,263 | Flowers | Feb. 8, 1949 |